(12) United States Patent
Schmidt

(10) Patent No.: US 11,858,305 B2
(45) Date of Patent: Jan. 2, 2024

(54) ROLL STABILIZER

(71) Applicant: Dr. Ing. h.c. F. Porsche Aktiengesellschaft, Stuttgart (DE)

(72) Inventor: Boris Schmidt, Karlsruhe (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/879,889

(22) Filed: Aug. 3, 2022

(65) Prior Publication Data

US 2023/0044414 A1 Feb. 9, 2023

(30) Foreign Application Priority Data

Aug. 4, 2021 (DE) .................. 10 2021 120 236.1

(51) Int. Cl.
*B60G 21/055* (2006.01)
*B60G 17/02* (2006.01)

(52) U.S. Cl.
CPC ............................ *B60G 21/0551* (2013.01)

(58) Field of Classification Search
CPC ...... B60G 17/00; B60G 17/02; B60G 17/025; B60G 21/0551; B60G 21/0553; B60G 21/0556; B60G 21/0558; B60G 2204/122; B60G 2204/1224; B60G 2204/1226; B60G 2204/61; B60G 2206/427; B60G 2206/8207; B60G 2500/20; B60G 2500/22

See application file for complete search history.

(56) References Cited

U.S. PATENT DOCUMENTS

2022/0032722 A1\* 2/2022 Smith ................ B60G 21/0551

FOREIGN PATENT DOCUMENTS

| CN | 203543577 U | 4/2014 |
| DE | 19633819 A1 | 2/1998 |
| DE | 102017124240 A1 | 4/2019 |
| DE | 102017124241 A1 | 4/2019 |
| JP | H115425 A1 \* | 1/1999 |

OTHER PUBLICATIONS

Description Translation for DE 19633819 from Espacenet (Year: 1998).\*

\* cited by examiner

*Primary Examiner* — Jason D Shanske
*Assistant Examiner* — Daniel M. Keck
(74) *Attorney, Agent, or Firm* — RatnerPrestia

(57) ABSTRACT

A roll stabilizer in the form of a stabilizer bar which has a connecting portion at each end. The connecting portion is configured such that at least two bores are arranged on a circle arc. The center point of the circle arc constitutes the upper pivot point of the connecting element.

6 Claims, 3 Drawing Sheets

ROLL STABILIZER

CROSS-REFERENCE TO RELATED APPLICATION

Figure 1:
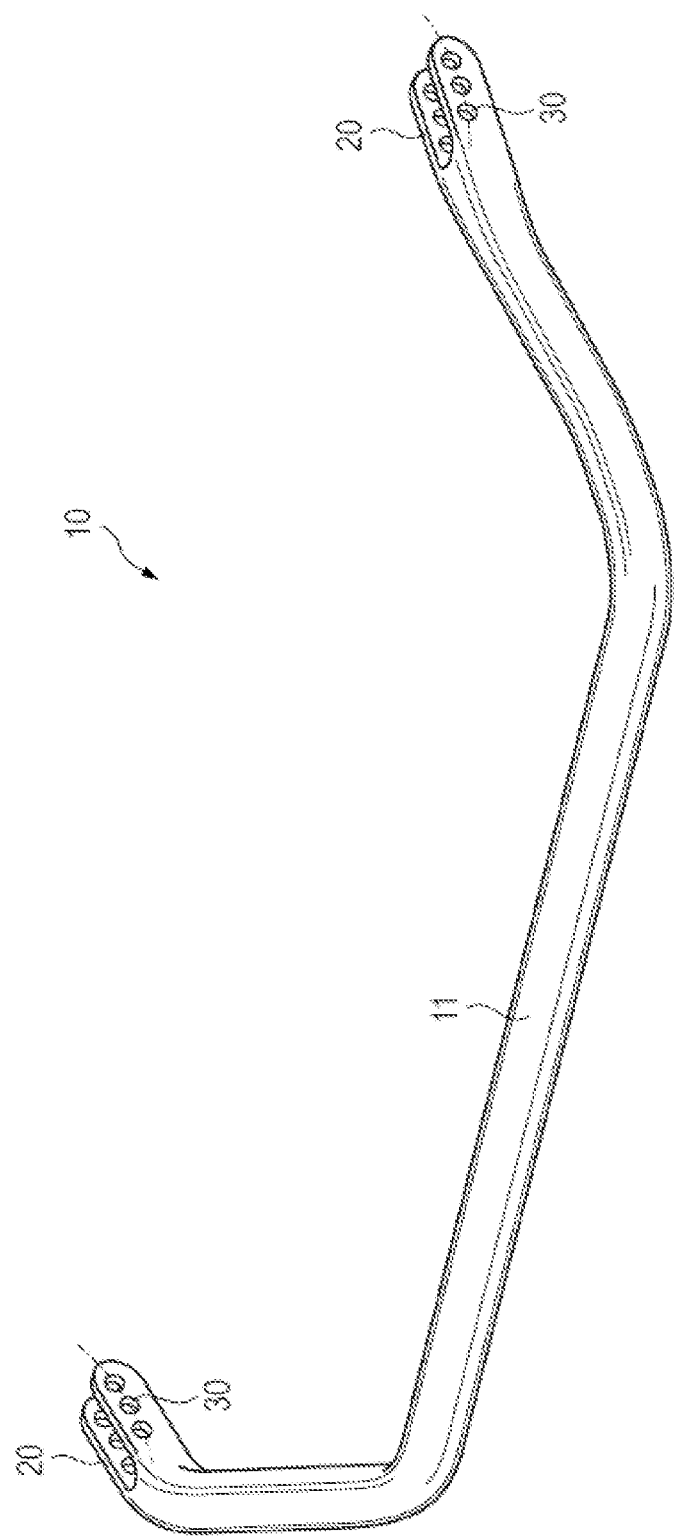

This application claims priority to German Patent Application No. 10 2021 120 236.1, filed Aug. 4, 2021, the content of such application being incorporated by reference herein in its entirety.

FIELD OF THE INVENTION

The invention concerns a roll stabilizer for stabilizing a vehicle.

BACKGROUND OF THE INVENTION

A roll stabilizer stabilizes a vehicle during cornering. A passive roll stabilizer is configured as a torsion spring and counteracts the roll forces which occur when a vehicle travels round a corner.

Stabilizer bars, as passive roll stabilizers of a vehicle, are known from the prior art. One such stabilizer bar is disclosed for example in DE 10 2017 124 240 A1, which is incorporated by reference herein.

Furthermore, a U-shaped or also a flat connecting portion of a stabilizer bar is known. For connection, the vehicle chassis has a suitable connecting portion which forms the counter-piece to the connecting portion of the stabilizer bar. Such a connection of the stabilizer bar is disclosed in DE 10 2017 124 241 A1, which is incorporated by reference herein.

The connection of a stabilizer bar to the vehicle chassis by means of a bolted connection is described in the prior art. Three bores provided for connection are known for example from CN 203543577 U, which is incorporated by reference herein.

It is furthermore known to arrange three bores for connection to the vehicle chassis in a line in the axial direction of the stabilizer bar. By connecting the stabilizer bar to the vehicle chassis by means of one of the bores, several different spring rates can be set.

SUMMARY OF THE INVENTION

It would be desirable to provide a greater number of settable spring rates of the stabilizer bar, or reduce the conversion complexity for the same number of different spring rates and hence reduce the component weight for the same number of spring rates.

In a connecting portion of a stabilizer bar, at least two bores are arranged on a circle arc, wherein the center point of the circle arc lies at the pivot point of the suspension-side connecting point of the connecting element on the roll stabilizer.

One advantage of the device described is that the stabilizer bar can be connected at the two connecting portions in mirror-symmetrically non-corresponding bores without a secondary spring rate being set at the stabilizer bar.

Because of the arrangement of the at least two bores on a circle arc, the length of the lever arm between the bore and the pivot point 50 of the roll stabilizer is constant, so that a connection is possible by means of mirror-symmetrically non-corresponding bores without cross-mounting the stabilizer bar. The result is a larger number of settable spring rates of the stabilizer bar.

BRIEF DESCRIPTION OF THE DRAWING FIGURES

Figure 2:
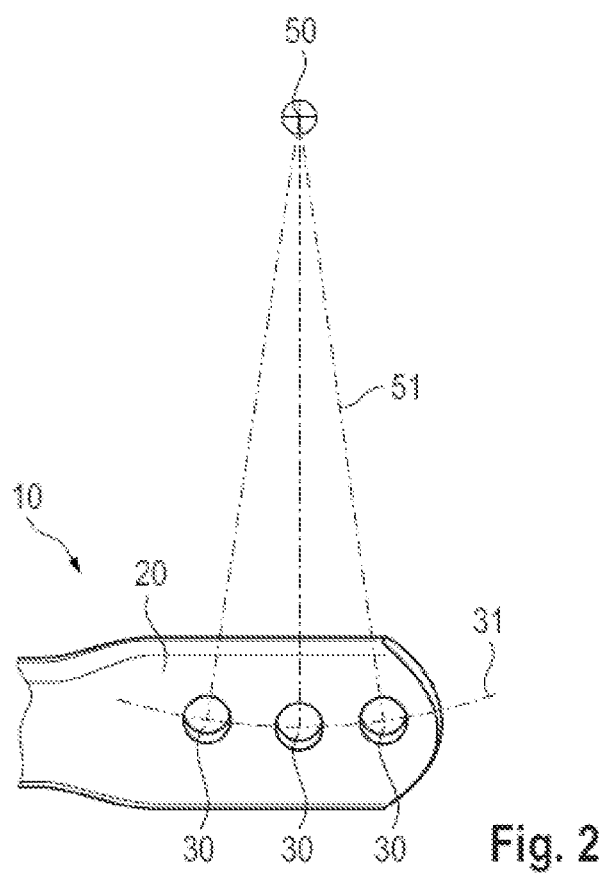
Figure 3:
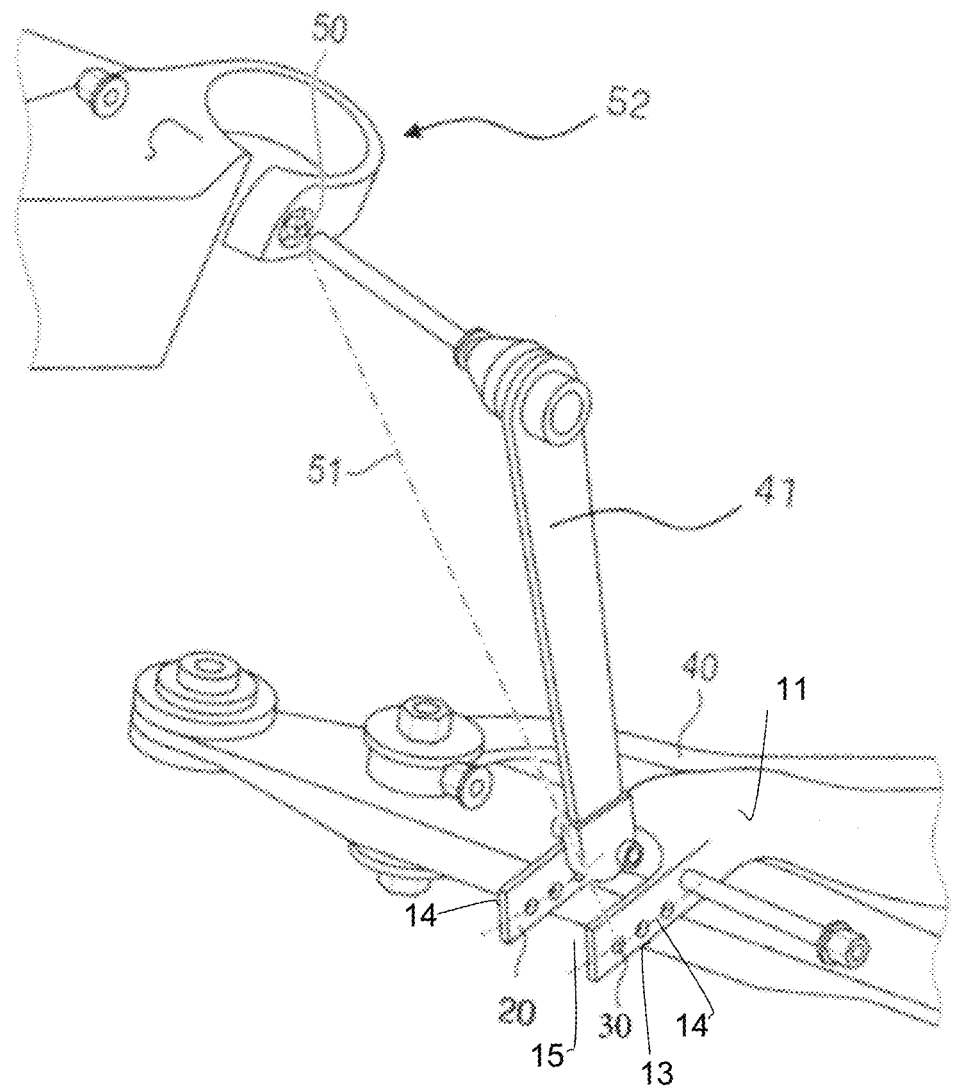

The invention is explained in more detail below with reference to three figures. The drawings show:

FIG. 1 a schematic illustration of a stabilizer bar,

FIG. 2 a schematic illustration of the connecting portion of the stabilizer bar and the arrangement of the bores, and FIG. 3 a schematic illustration of the vehicle chassis.

DETAILED DESCRIPTION OF THE INVENTION

FIG. 1 shows a roll stabilizer 10 formed as a stabilizer bar 11 with connecting portions 20 arranged at each end. Each connecting portion 20 has three bores 30. However, two, four or more bores are also conceivable.

FIG. 2 shows a connecting portion 20. This is configured such that three bores 30 are arranged on a circle arc 31, wherein the center point of the circle arc 31 constitutes the pivot point 50 of the wheel-carrying parts 52 (see FIG. 3). The lever arm 51 between the pivot point 50 and each bore 30 is constant in length.

The spring rate of the stabilizer bar 11 can be adjusted by varying the bore 30 used for connection (see FIG. 3). For example, one spring rate of the stabilizer bar 11 is achieved if, in each case in mirror-symmetrically corresponding fashion, the bore 30 closest to the open end of the stabilizer bar 11 is used for connection to the wheel-carrying parts 52. The spring rate of the stabilizer bar 11 may be increased by using a middle bore 30 in one of the two connecting portions 20, wherein a mirror-symmetrically non-corresponding connection exists.

FIG. 3 shows the vehicle chassis 40 with the stabilizer bar 11 which is mounted by the connecting element 41 at the connecting portion 20 and at the pivot point 50. The connecting portion 20 has three bores 30 which are arranged correspondingly to the connecting portion 20 of the stabilizer bar 11. Each formed connection portion 20 is integrally formed on the roll stabilizer bar 11 and includes a bifurcated end 13 including two opposing connecting segments 14 and a space 15 disposed between the two opposing connecting segments 14 that is sized to receive the connecting element 41. In an installation situation, the lever arm 51 exists between the bore 30 and the pivot point 50.

The used bore 30 of the connecting portion 20 is here mirror-symmetrically corresponding or mirror-symmetrically non-corresponding in the connecting portions 20. For example, connection is possible at both connecting portions 20 in the bore 30 closest to the open end of the connecting portion 20. The stabilizer bar 11 (not shown) can however also be connected by a combination of two mirror-symmetrically non-corresponding bores 30, for example the combination of the bore closest to the open end of the connecting portion 20 and a middle bore 30 in the opposite connecting portion 20.

Depending on the combination of bores 30 used on each side of the stabilizer at the connecting portions 20, different spring rates may thus be set.

To summarize, the invention proposes a refined roll stabilizer in the form of a stabilizer bar. At least two bores in the connecting portion of the stabilizer bar are arranged on a circle arc, wherein the center point of the circle arc constitutes the pivot point 50 of the connection to the connecting element 41.

The person skilled in the art will suitably modify the above-described exemplary embodiments or combine these with one another without deviating from the core of the invention.

What is claimed is:

1. A roll stabilizer bar comprising:
a formed connecting portion disposed at each end of the roll stabilizer bar for connection to a respective wheel-carrying part via a connecting element,
wherein each formed connection portion is integrally formed on the roll stabilizer bar and includes a bifurcated end including two opposing connecting segments and a space disposed between the two opposing connecting segments that is sized to receive the connecting element,
wherein each connecting segment of the two opposing connecting segments has at least two bores for connection to the connecting element, wherein different spring rates can be set using different bores of the at least two bores to connect the connecting element,
wherein, for each formed connection portion, the at least two bores are arranged on a circle arc at the end of the roll stabilizer bar, and a center point of the circle arc lies at a pivot point of the connecting element.

2. The roll stabilizer bar as claimed in claim 1, wherein a length of a lever arm between a respective bore and the pivot point is constant.

3. The roll stabilizer bar as claimed in claim 1, wherein, for each formed connection portion, one of the at least two bores in each connecting segment is used for mounting to the connecting element.

4. The roll stabilizer bar as claimed in claim 1, wherein the roll stabilizer bar is composed of either spring steel or carbon steel.

5. A vehicle chassis of a vehicle comprising the roll stabilizer bar of claim 1, the respective wheel-carrying part and the connecting element.

6. The vehicle chassis as claimed in claim 5, wherein the connecting element is positioned in said space disposed between the two opposing connecting segments.

* * * * *